United States Patent
Kang et al.

(10) Patent No.: US 9,668,111 B2
(45) Date of Patent: May 30, 2017

(54) TERMINAL FOR CONTENTS SHARING, AN OPERATING METHOD THEREOF, AND A VEHICLE INFORMATION PROVIDING TERMINAL

(71) Applicant: INFOBANK CORP., Seongnam-si, Gyeonggi-do (KR)

(72) Inventors: Hong Suk Kang, Yongin-si (KR); Ji Hoon Ah, Seoul (KR); Jong Cheol Hong, Seoul (KR)

(73) Assignee: INFOBANK CORP., Seongnam-si, Gyeonggi-do (KR)

( * ) Notice: Subject to any disclaimer, the term of this patent is extended or adjusted under 35 U.S.C. 154(b) by 0 days.

(21) Appl. No.: 14/933,802

(22) Filed: Nov. 5, 2015

(65) Prior Publication Data

US 2016/0183063 A1 Jun. 23, 2016

(30) Foreign Application Priority Data

Dec. 19, 2014 (KR) ........................ 10-2014-0184784
Dec. 19, 2014 (KR) ........................ 10-2014-0184809

(51) Int. Cl.
*H04M 3/42* (2006.01)
*H04W 4/06* (2009.01)
(Continued)

(52) U.S. Cl.
CPC .............. *H04W 4/06* (2013.01); *G07C 5/008* (2013.01); *G07C 5/06* (2013.01); *G01C 21/36* (2013.01);
(Continued)

(58) Field of Classification Search
CPC ...... G07C 5/06; G07C 5/008; G01C 21/3667; H04W 4/06; H04W 84/12; H04W 88/04; H04W 84/005
(Continued)

(56) References Cited

U.S. PATENT DOCUMENTS 8,705,527 B1 * 4/2014 Addepalli ............. H04W 4/046
370/389
8,799,360 B2 * 8/2014 Nicholson .............. B60K 35/00
701/1

(Continued)

FOREIGN PATENT DOCUMENTS

KR 10-2005-0044047 A 5/2005
KR 10-2008-0103370 A 11/2008
KR 10-2014-0016467 A 2/2014

*Primary Examiner* — Marceau Milord
(74) *Attorney, Agent, or Firm* — Novick, Kim & Lee, PLLC; Sang Ho Lee

(57) ABSTRACT

Provided is a terminal of providing a vehicle interface to a vehicle information providing terminal, the terminal including: a terminal information collection unit configured to collect terminal information of the other terminal capable of transceiving contents data; a wireless communication unit configured to receive a reproduction request of the contents data transmitted from the other terminal; a contents interface generator configured to generate a contents interface provided through the vehicle interface based on the terminal information and the contents data reproduction request; and a contents data relay unit configured to reproduce the contents data received from the other terminal through the contents interface to control the reproduced contents data to be provided to the vehicle information providing terminal.

13 Claims, 12 Drawing Sheets

(51) Int. Cl.
*G07C 5/06* (2006.01)
*G07C 5/00* (2006.01)
*H04W 84/12* (2009.01)
*H04W 88/04* (2009.01)
*H04W 84/00* (2009.01)
*G01C 21/36* (2006.01)

(52) U.S. Cl.
CPC .......... *H04W 84/005* (2013.01); *H04W 84/12* (2013.01); *H04W 88/04* (2013.01)

(58) Field of Classification Search
USPC ...................................................... 455/414.1
See application file for complete search history.

(56) References Cited

U.S. PATENT DOCUMENTS

| | | | | |
|---|---|---|---|---|
| 8,831,585 B2* | 9/2014 | Nicholson | ............. | H04W 12/08 |
| | | | | 385/56 |
| 9,348,555 B2* | 5/2016 | Scholz | ...................... | G06F 7/00 |
| 2014/0306814 A1* | 10/2014 | Ricci | ..................... | H04W 48/04 |
| | | | | 340/425.5 |
| 2014/0365895 A1* | 12/2014 | Magahern | ............... | G06F 3/016 |
| | | | | 715/727 |
| 2015/0232065 A1* | 8/2015 | Ricci | ...................... | B60R 25/01 |
| | | | | 701/36 |

* cited by examiner

TERMINAL FOR CONTENTS SHARING, AN OPERATING METHOD THEREOF, AND A VEHICLE INFORMATION PROVIDING TERMINAL

INCORPORATION BY REFERENCE

This application claims benefit of priority from Korean patent application Nos. 10-2014-0184784 and 10-2014-0184809 filed in the Korean Intellectual Property Office on Dec. 19, 2014, the entire contents of which are hereby incorporated by reference.

TECHNICAL FIELD

The present invention relates to a vehicle information providing terminal provided in a vehicle and a plurality of portable terminals, and more particularly, to a terminal providing a vehicle interface through the vehicle information providing terminal and an operating method thereof.

BACKGROUND ART

Terminals may be divided into mobile/portable terminals and stationary terminals according to whether the terminals are movable. Further, the mobile terminals may be divided into handheld terminals and vehicle mount terminals according to whether a user is capable of directly holding the terminal.

The terminals may be implemented in a multimedia player type having complex functions such as photographing still images or motion pictures, reproducing music or video files, games, reception of broadcasting, and navigations.

In order to support and increase functions of the terminal, it may be considered that a structural part of a software part of the terminal is improved.

Further, in modern times, as the penetration rate of smart phones is increased, techniques of controlling a vehicle information providing terminal or a smart phone have been distributed by wiredly or wirelessly connecting the smart phone of the user to a general vehicle information providing terminal (for example, an audio video navigation (AVN) system) which is provided in the vehicle.

However, an existing vehicle information providing terminal may output contents (motion pictures, music, games, and reception of broadcasting) and the like which are provided by the smart phone only when being wiredly or wirelessly connected with the smart phone. As a result, there is a problem in that when the contents are received though another terminal, the smart phone which is wiredly or wirelessly connected in the related art needs to be separated from the vehicle information providing terminal. Further, when the smart phone connected with the vehicle information providing terminal downloads massive data, there is problem in that a long time is required.

DISCLOSURE

Technical Problem

The present invention provides a terminal for contents sharing which outputs contents data of the other terminal to a vehicle information providing terminal by using a wireless communication function in a local area when a terminal connected to vehicle information providing terminal in a vehicle receives a contents request signal from the other terminal, an operating method thereof, and a vehicle information providing terminal.

Technical Solution

An embodiment of the present invention provides a vehicle information providing terminal providing vehicle information including: an interface unit connected with a terminal providing an contents interface; an output unit configured to receive and output the contents interface provided to the interface unit and provide a selection list through the contents interface when a contents data request signal is received from the terminal; and a user input unit configured to receive a selection input for selecting a second terminal capable of downloading the content data in the selection list, in which the interface unit transfers the selection input to a terminal receiving the contents data request signal is received in order to transmit the contents data between the terminal receiving the contents data request signal and the second terminal.

Another embodiment of the present invention provides a terminal of providing a vehicle interface to a vehicle information providing terminal, the terminal including: a terminal information collection unit configured to collect terminal information of the other terminal capable of transceiving contents data; a wireless communication unit configured to receive a reproduction request of the contents data transmitted from the other terminal; a contents interface generator configured to generate a contents interface provided through the vehicle interface based on the terminal information and the contents data reproduction request; and a contents data relay unit configured to reproduce the contents data received from the other terminal through the contents interface to control the reproduced contents data to be provided to the vehicle information providing terminal.

Advantageous Effects

According to the embodiment of the present invention, the first terminal may relay the contents data provided by at least one second terminal provided in the vehicle, when the first terminal of the driver is wiredly/wirelessly connected to the vehicle information providing terminal in the vehicle by the driver while driving the vehicle. As a result, the first terminal may simply share the contents data of the second terminal provided in the vehicle and overcome an inconvenience of separating the first terminal and the vehicle information providing terminal by receiving the contents data provided by the second terminal and transferring the received contents data to the vehicle information providing terminal, and the driver and a passenger riding in the vehicle may easily share the contents data. Further, the present invention has advantages of reducing a time taken for the first terminal to download large contents data by dividing and downloading the large contents data through at least one second terminal provided in the vehicle to transmit the downloaded data to the first terminal, when the first terminal downloads the large contents data through wireless communication.

MODE FOR INVENTION

Hereinafter, terminals according to the present invention will be described in more detail with reference to the accompanying drawings. Further, "module" and "unit" which are suffixes for the components used in the specification are granted or mixed by considering only easiness in preparing the specification and do not have meanings or roles distinguished from each other in themselves.

In terminals described in this specification, a mobile phone, a smart phone, a laptop computer, a digital broadcasting terminal, personal digital assistants (PDA), a portable multimedia player (PMP), a navigation, and the like may be included. Next, an overall system including terminals according to an embodiment of the present invention will be described with reference to FIG. 1.

Figure 1:
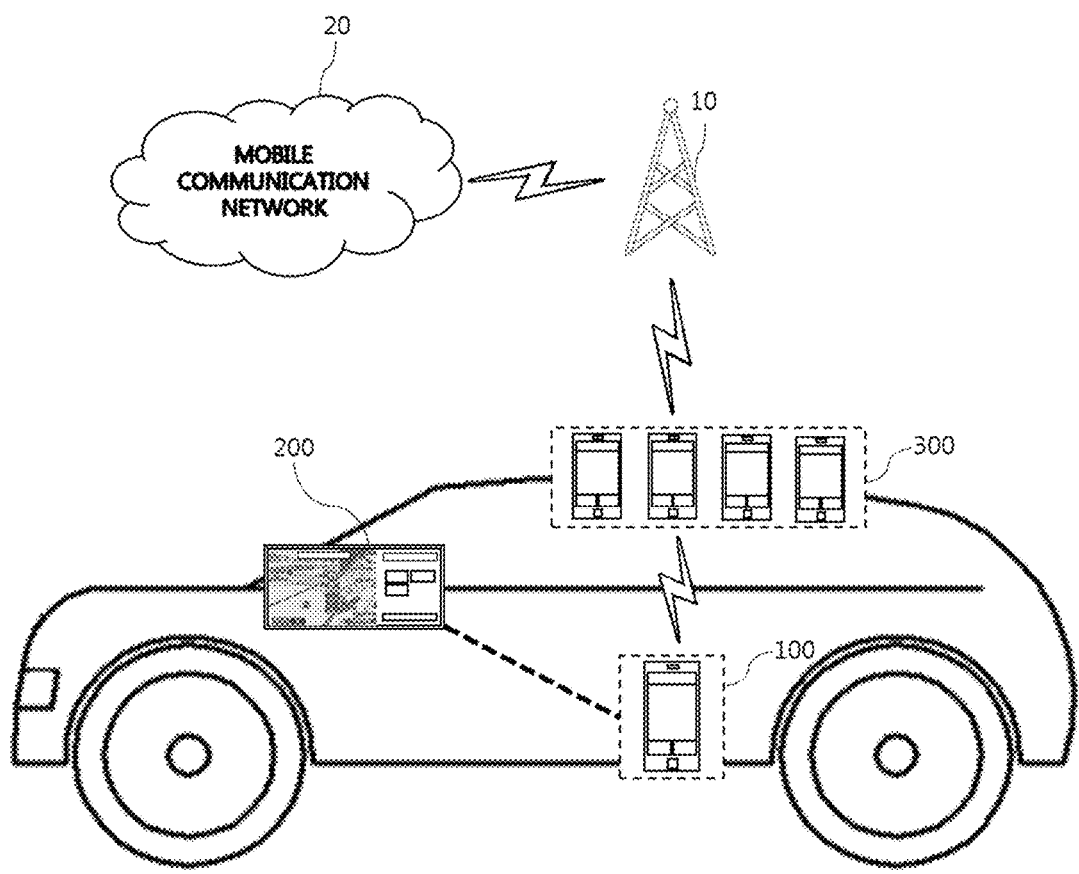
FIG. 1 is an exemplary diagram illustrating a state where a plurality of terminals is wiredly/wirelessly connected with a vehicle information providing terminal in a vehicle according to an embodiment of the present invention.

FIG. 1 is an exemplary diagram illustrating a state where a plurality of terminals is wiredly/wirelessly connected with a vehicle information providing terminal in a vehicle according to an embodiment of the present invention.

An overall system according to an embodiment of the present invention is configured by a first terminal 100 positioned in a vehicle, a vehicle information providing terminal 200, and a second terminal 300.

The vehicle information providing terminal 200 may be implemented as various devices which are provided or installed in the vehicle. For example, the vehicle information providing terminal 200 may be implemented by various devices, such as a navigation system capable of performing route guidance to a predetermined point, a black box storing image information by photographing a surrounding of the vehicle, a smart phone, a tablet computer, a laptop computer, a personal digital assistant (PDA), and a portable multimedia player (PMP). In the case where the vehicle information providing terminal 200 is implemented by the black box for the vehicle, The vehicle information providing terminal 200 according to the embodiment of the present invention which may perform such an operation may be implemented, for example, a navigation system for a vehicle, a black box for the vehicle, or an augmented reality system.

In the case where the vehicle information providing terminal 200 is the navigation system for the vehicle or the augmented reality system, the vehicle information providing terminal 200 may mean a system which notifies various kinds of data regarding operation, maintenance, and the like of the vehicle to a driver and a passenger of the vehicle. In this case, the vehicle information providing terminal 200 may be the navigation system for the vehicle itself and may be referred to as a concept including various display devices operating in connection with the first terminal 100 proving a vehicle interface widely or wirelessly.

Particularly, the first terminal 100 may configure a system integrated by providing various information which may provide, compensate, and increase a function of the navigation system for the vehicle by the vehicle information providing terminal 200. In the overall system, the first terminal 100 may be implemented by a smart phone which may be connected to a mobile communication network, a tablet computer, a laptop computer, a personal digital assistant (PDA), a portable multimedia player (PMP), and the like. The vehicle information providing terminal 200 is wiredly/wirelessly connected with the first terminal 100 to be provided in the interior of the vehicle. As a result, the user may control the first terminal 100 through the vehicle information providing terminal 200. Further, the user may control the vehicle information providing terminal 200 by using the first terminal 100.

In addition, the first terminal 100 according to the embodiment of the present invention may autonomously output a first interface which may control a basic function of the first terminal 100 in a first mode. In the first mode, basically, the first terminal 100 may perform functions provided to the user, regardless of the function of the vehicle information providing terminal 200. For example, the basic function may include a calling function, a text function, an Internet function, a memo function, a schedule function, or the like.

In addition, the first terminal 100 according to the embodiment of the present invention may be connected with the vehicle information providing terminal 200. In this case, the first terminal 100 outputs a contents interface to the vehicle information providing terminal 200 and may be converted to a second mode in which the contents interface is controlled. Particularly, in the second mode, the first terminal 100 may generate a control signal for controlling the contents interface to control the contents interface.

Meanwhile, in the interior of the vehicle, one or more second terminals 300 which are wirelessly connected with the vehicle information providing terminal 200 and the first terminal 100 may be further included. Further, the second terminal 100 may receive a call signal or contents data through a base station 10 and a mobile communication network 20.

The second terminal 300 may be a general portable terminal. A plurality of second terminals 300 may be provided in the interior of the vehicle.

Next, a structure of the first terminal 100 according to the embodiment of the present invention will be described with reference to FIG. 2.

Figure 2:
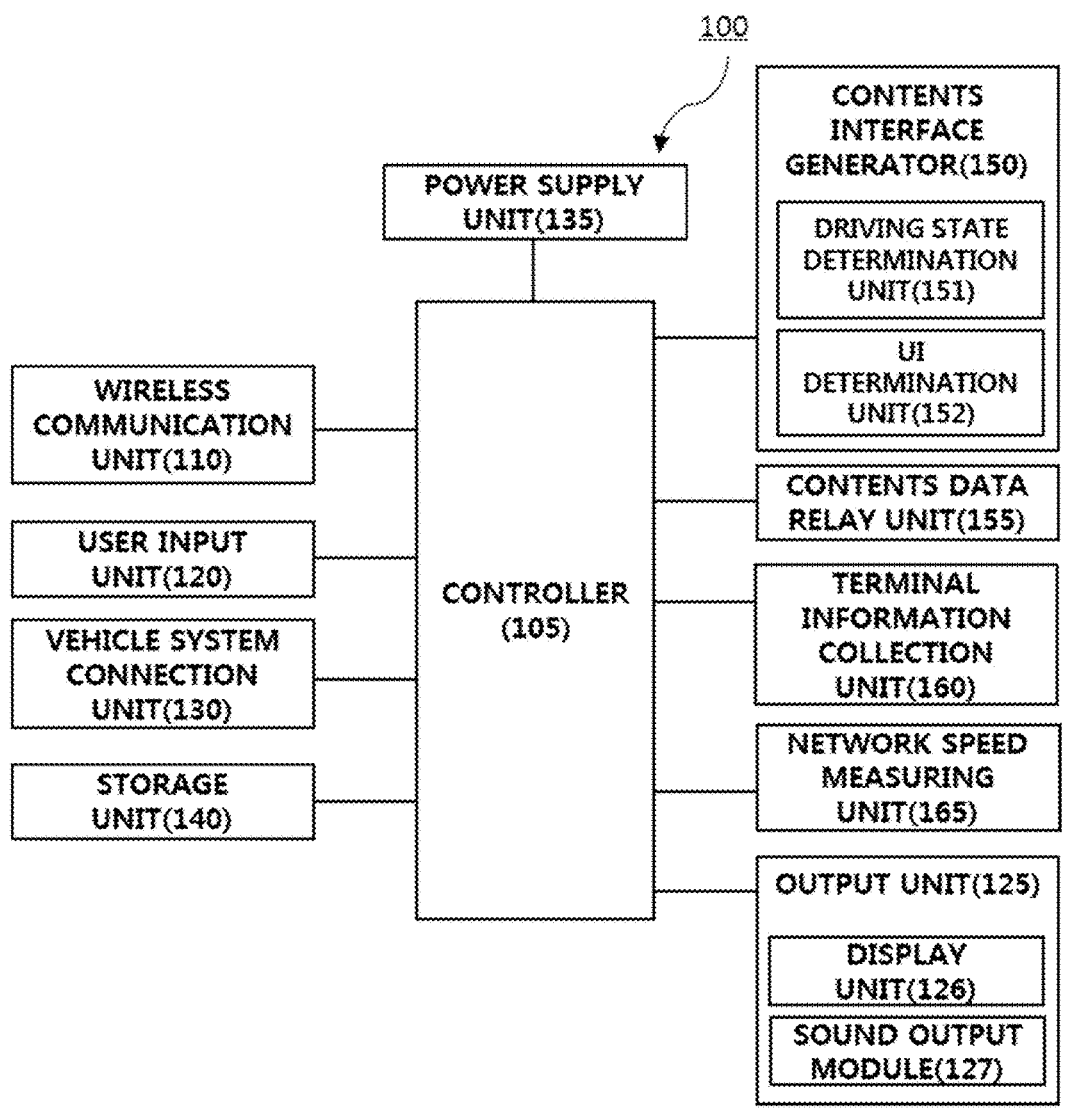
FIG. 2 is a block diagram illustrating a structure of a first terminal according to the embodiment of the present invention.

FIG. 2 is a block diagram of the first terminal 100 according to the embodiment of the present invention.

The first terminal 100 may include a controller 105, a wireless communication unit 110, a user input unit 120, an output unit 125, a vehicle system connection unit 130, a power supply unit 135, a storage unit 140, a contents interface generator 150, a contents data relay unit 155, and a terminal information collection unit 160.

The components illustrated in FIG. 2 are not essential components. Therefore, the first terminal 100 having more components therethan or less components therethan may be implemented.

Hereinafter, the components will be described in sequence.

First, the wireless communication unit 110 may include one or more modules which enable wireless communication between the networks. For example, the wireless communication unit 110 may include a mobile communication module, a wireless internet module, a short range communication module, a position information module, and the like and enables communication with the second terminal 300 or the base station.

The mobile communication module transceivers a wireless signal with at least one of the base station, an external terminal, and a server on the mobile communication network. The wireless signal may include a voice signal, a video signal, a voice call signal, a video call signal, or various types of data according to transmission and reception of text/multimedia messages.

The wireless internet module means a module for wireless internet access and may be internally or externally installed in the first terminal 100. As the wireless Internet technology, wireless LAN (WLAN) (Wi-Fi), wireless broadband (Wibro), world interoperability for microwave access (Wimax), high speed downlink packet access (HSDPA), or the like, may be used.

The short range communication module means a module for short range communication. As short range communication technology, Bluetooth, radio frequency identification (RFID), infrared data association (IrDA), ultra wideband (UWB), ZigBee, or the like may be used.

The user input unit 120 generates input data for controlling an operation of the first terminal 100 by the user. The user input unit 120 may be configured by a key pad, a dome switch, a touch pad (static pressure/static electricity), a jog wheel, a jog switch, or the like.

The output unit 125 for generating an output related with sight, hearing, or touch may include a display unit 126, a sound output module 127, and the like.

The display unit 126 displays (outputs) information processed in the first terminal 100. For example, the first terminal 100 displays a user interface (UI) or a graphic user interface (GUI) related with a calling in the contents interface providing mode. Further, when the first terminal 100 is in a calling mode, the UI related with the calling may be displayed. When the first terminal 100 is in the vehicle interface providing mode, the UI related with the vehicle interface may be displayed.

The display unit 126 may include a liquid crystal display (LCD), a thin film transistor-liquid crystal display (TFT LCD), or the like.

The sound output module 127 may output audio data which are received from the wireless communication unit 110 or stored in the storage unit 140 in a call signal reception mode, a calling mode, a recoding mode, a voice recognition mode, a broadcast reception mode, or the like. The sound output module 127 may also output a sound signal related with a function (e.g., a call signal reception sound, a massage reception sound, or the like) performed by the first terminal 100. The sound output module 127 may include a receiver, a speaker, a buzzer, and the like.

The storage unit 140 may store a program for operating the controller 105 and also temporarily store input/output data. The storage unit 140 may store data regarding various pattern vibrations and sounds output in the touch input on the touch screen.

The vehicle system connection unit 130 serves as a passage with the vehicle system connected to the first terminal 100. The vehicle system connection unit 130 receives the data from the vehicle system or receives power to be transferred to each constituent element inside the first terminal 100 or allow the contents data inside the first terminal 100 and data thereon to be transmitted to the vehicle system.

For example, a wired/wireless headset port, an external charger port, a wired/wireless data port, a memory card port, an audio input/output (I/O) port, a input/output (I/O) port, an earphone port, and the like may be included in the vehicle system connection unit 130.

The controller 105 generally controls an overall operation of the first terminal 100. For example, the controller 105 performs related control and processing for voice calls, data communication, video calls, and the like. Further, the controller 105 may generate a contents interface by controlling the constituent elements and provide the generated contents interface to the vehicle information providing terminal 200.

The power supply unit 135 receives external power and internal power by controlling the controller 105 to supply power required for operations of respective constituent elements.

The contents interface generator 150 generates the contents interface according to a predetermined type and transfers the generated contents interface to the vehicle information providing terminal 200 through the vehicle system connection unit 130. The contents interface may be a combination of video or voice data or converted and transmitted into a control data format which may be output from the vehicle information providing terminal 200.

The contents interface may include an interface for video reproduction. The contents interface according to the embodiment of the present invention includes a GUI for reproducing various contents through the vehicle information providing terminal 200. In addition, the controller 105 reproduces the contents according to a user input to the contents interface to provide the reproduced contents to the vehicle information providing terminal 200, and the vehicle information providing terminal 200 may receive and decode the contents data to output the vehicle interface. The contents data may have various formats for outputting the video or voice content from the vehicle information providing terminal 200.

Further, the contents interface may provide a list of the second terminals 300 which are selectable for the data reception in the case where the input signal of the user is received and the data of the contents are not stored according to the embodiment of the present invention.

In addition, the contents interface generator 150 may include a driving state determination unit 151, a UI determination unit 152, and the like.

The driving state determination unit 151 determines a driving state of the vehicle while driving. For example, the driving state determination unit 151 may determine a current velocity of the vehicle, whether there are crossroads, whether the vehicle stops, and the like. Further, the driving state determination unit 151 may determine whether the driver can control the contents through the first terminal. In addition, the driving state determination unit 151 generates driving state information based on the determined result to provide the generated driving state information to the UI determination unit 152.

The UI determination unit 152 determines a UI input method and a UI function of the contents interface based on the driving state information provided through the driving state determination unit 151. The contents interface may be controlled according to any one method of methods such as touch, voice recognition, and motion recognition, and the UI function may be partially limited according to the driving state.

The contents data relay unit 155 relays the contents data received by the first terminal 100 to be transferred to the vehicle information providing terminal 200 when the second terminal 300 is selected and transmits the contents data to the first terminal 100.

The terminal information collection unit 160 retrieves the second terminal 300 which may download the contents data and collects terminal information of the second terminal 300 which may download the contents data to store the collected terminal information in the storage unit 140. The terminal information collection unit 160 may transmit a signal for requesting whether the contents are downloaded to the second terminal 300 positioned therearound in order to retrieve the second terminal 300 which may download the contents data.

In addition, a network speed measuring unit 165 measures a wireless data transmission speed of the second terminal 300 and may store the data.

For example, when the first terminal 100 is wiredly/wirelessly connected with the vehicle information providing terminal 200, if the first terminal 100 receives the signal for requesting the contents from the second terminal 300 through remote communication, the terminal information collection unit 160 of the first terminal 100 retrieves at least one second terminal 300 which may download the contents data and provides the collected terminal information to the contents interface generator 150. The collected terminal information is included in the contents interface to be transmitted to the vehicle information providing terminal 200.

Next, a structure of the vehicle information providing terminal 200 according to the embodiment of the present invention will be described with reference to FIG. 3.

Figure 3:
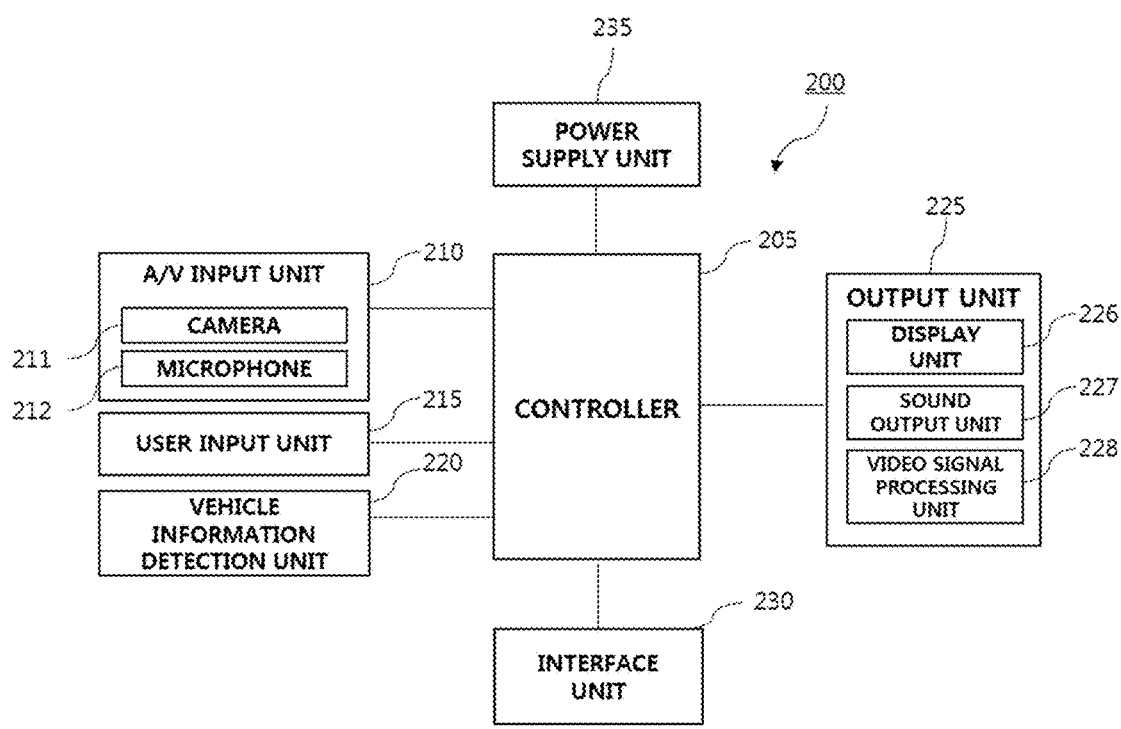
FIG. 3 is a block diagram illustrating the vehicle information providing terminal according to the embodiment of the present invention.

FIG. 3 is a block diagram of the vehicle information providing terminal 200 according to the embodiment of the present invention.

The vehicle information providing terminal 200 is wiredly/wirelessly connected with the aforementioned first terminal 100 and receives the generated contents interface from the first terminal 100 to perform the display. Further, the vehicle information providing terminal 200 detects vehicle information and may add and output the detected vehicle information to the contents interface.

To this end, the vehicle information providing terminal 200 may include an A/V input unit 210, a user input unit 215, a vehicle information detection unit 220, an output unit 25, an interface unit 230, a power supply unit 235, and the like.

The A/V input unit 210 provided in the vehicle information providing terminal 200 may be configured by a camera 211 and a microphone 212.

The camera 211 processes a video frame such as still images or motion pictures obtained by an image sensor in the video calling mode or the photographing mode. The processed video frame may be displayed on the display unit 226. Further, the controller 205 may recognize a motion of the driver through the camera 211. The controller 205 may control the contents interface displayed on the output unit 225 according to the motion recognition.

The microphone 212 receives an external sound signal by a microphone in the calling mode, the recording mode, the voice recognition mode, or the like to process the received sound signal to electrical voice data. The controller 205 may control the contents interface displayed on the output unit 225 according to the voice data, or control the control signal to be transferred to the first terminal 100 or the calling voice to be transferred to the first terminal 100.

The user input unit 215 generates input data for controlling the operation of the terminal by the user. The user input unit 215 may be configured by a key pad, a dome switch, a touch pad (static pressure/static electricity), a jog wheel, a jog switch, or the like.

The vehicle information detection unit 220 detects the vehicle information of the vehicle attached with the vehicle information providing terminal 200. The detected vehicle information may be a driving velocity of the vehicle, driving information of the driver, whether the vehicle is driven, surrounding situation information, or the like. Further, the detected vehicle information is displayed on the contents interface through the output unit 225 and thus the state information of the vehicle may also be provided to the user. As a result, the vehicle information providing terminal 200 may provide a state such as UI blocking or no control of the vehicle information providing terminal 200 to the user according to the driving velocity of the vehicle, the driving information of the driver, the surrounding situation information of the vehicle, or the like.

The interface unit 230 serves as a passage with all external devices connected to the vehicle information providing terminal 200. The interface unit 230 receives the contents interface data from the first terminal 100, receives power from an external power supply device to transfer the received power to each constituent element inside the interface unit 230, or transmits the data in the vehicle information providing terminal 200 to an external device such as the first terminal 100.

Next, a structure of the second terminal 300 according to the embodiment of the present invention will be described with reference to FIG. 4.

Figure 4:
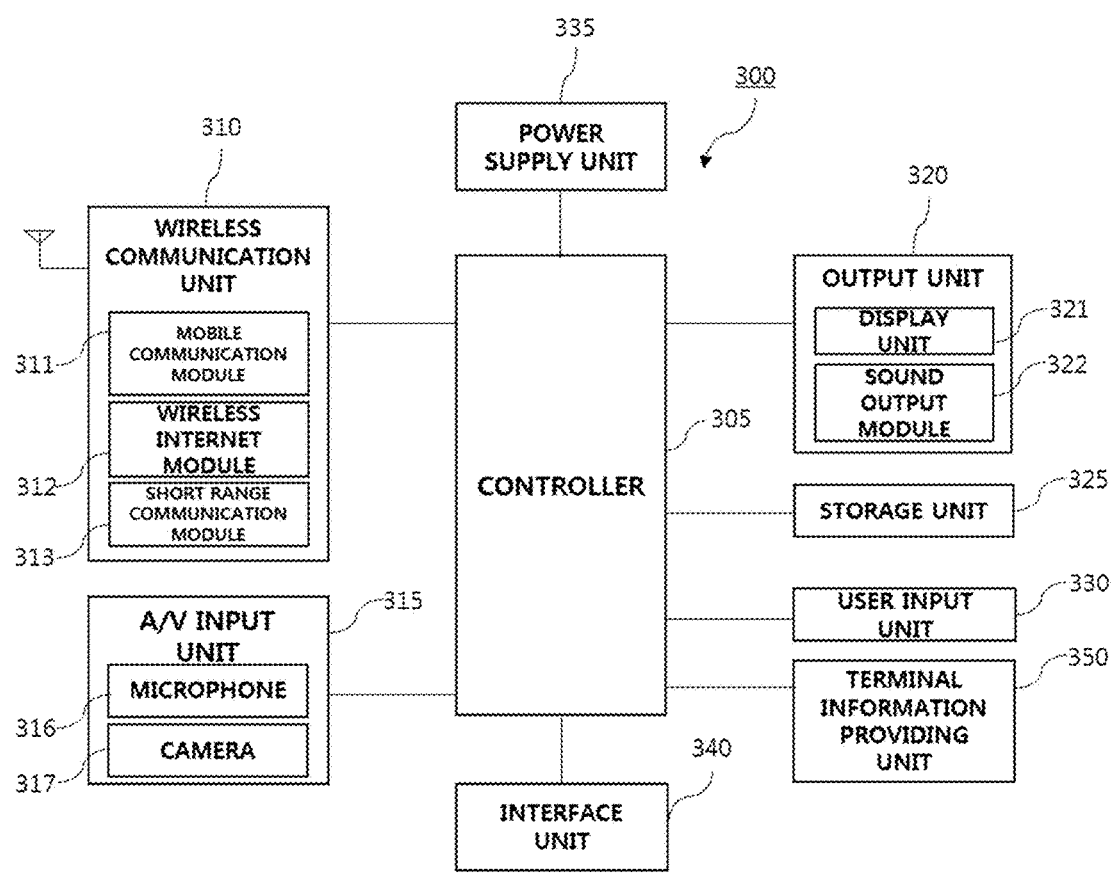
FIG. 4 is a block diagram illustrating a second terminal according to the embodiment of the present invention.

FIG. 4 is a block diagram of the second terminal 300 according to the embodiment of the present invention.

The second terminal 300 may include a controller 305, a wireless communication unit 310, an A/V input unit 315, an output unit 320, a storage unit 325, a user input unit 330, a power supply unit 335, an interface unit 340, and a terminal information providing unit 350.

The components illustrated in FIG. 4 are not essential components. Therefore, the second terminal 300 having more components therethan or less components therethan may be implemented.

Hereinafter, when describing the constituent elements in sequence, the description of similar constituent elements to the structure of the first terminal 100 described in FIG. 2 will be omitted.

The terminal information providing unit 350 provides terminal information to the first terminal 100 through the short range communication module 313 when a signal for requesting whether the contents transmitted from the terminal information collection unit 160 of the first terminal 100 is received to the short range communication module 313 of the second terminal 300.

The terminal information may include at least one of information whether the call is available, whether the contents are downloaded, and terminal identification information (a telephone number, a terminal serial number, or the like). The information whether the call is available and whether the contents are downloaded may vary according to a user setting of the second terminal 300.

The display unit 321 of the second terminal 300 may output whether a contents execution is set and a state while executing the contents, when a remote communication request is sent to the first terminal 100. Further, when the second terminal 300 performs the remote communication with the first terminal 100, the display unit 321 may further output a message which notifies that the first terminal 100 and the second terminal 300 are performing the remote communication.

The user input unit 300 may receive a command of accepting the remote communication request from the user when the remote communication request is received from the first terminal 100. Further, the user input unit 300 may receive a remote calling end command even in the case where the second terminal 300 and the first terminal 100 are performing the remote communication.

When the calling is selected, the controller 305 of the second terminal 300 controls the short range communication module 313, the output unit 320, the microphone 316, and the like to control the voice signal received from the first terminal 100 to be output and control the voice signal received from the microphone 316 to be transmitted to the first terminal 100.

The wireless communication unit 310 transmits the contents data to the first terminal 100 when the remote communication relayed in the first terminal 100 starts. Further, the terminal information of the second terminal 300 may also be transmitted.

Figure 5:
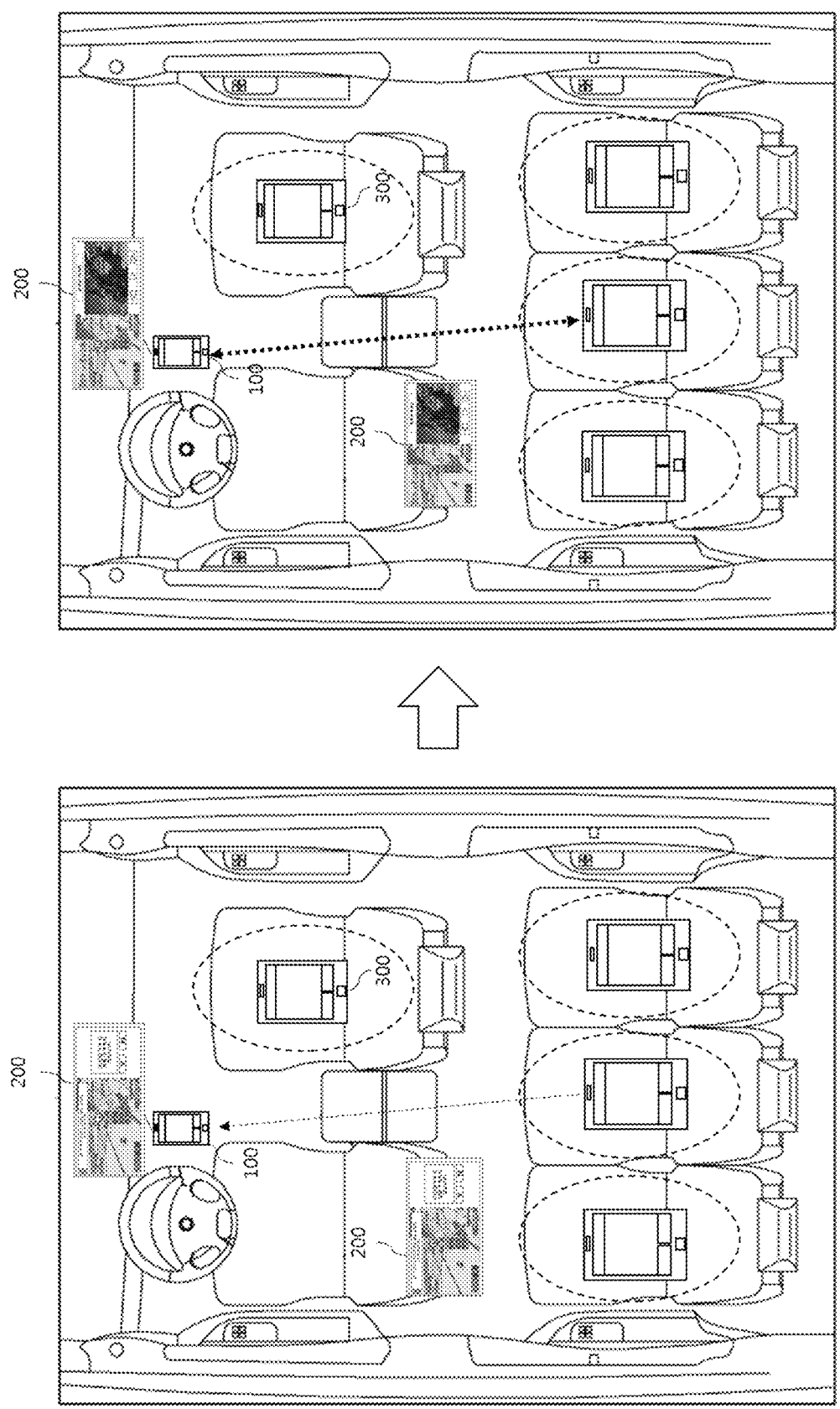
FIG. 5 is an exemplary diagram illustrating a situation in which the first terminal and the second terminal open a channel according to the embodiment of the present invention.

FIG. 5 is an exemplary diagram illustrating a situation in which the first terminal 100 and the second terminal 300 open a channel according to the embodiment of the present invention.

Figure 6:
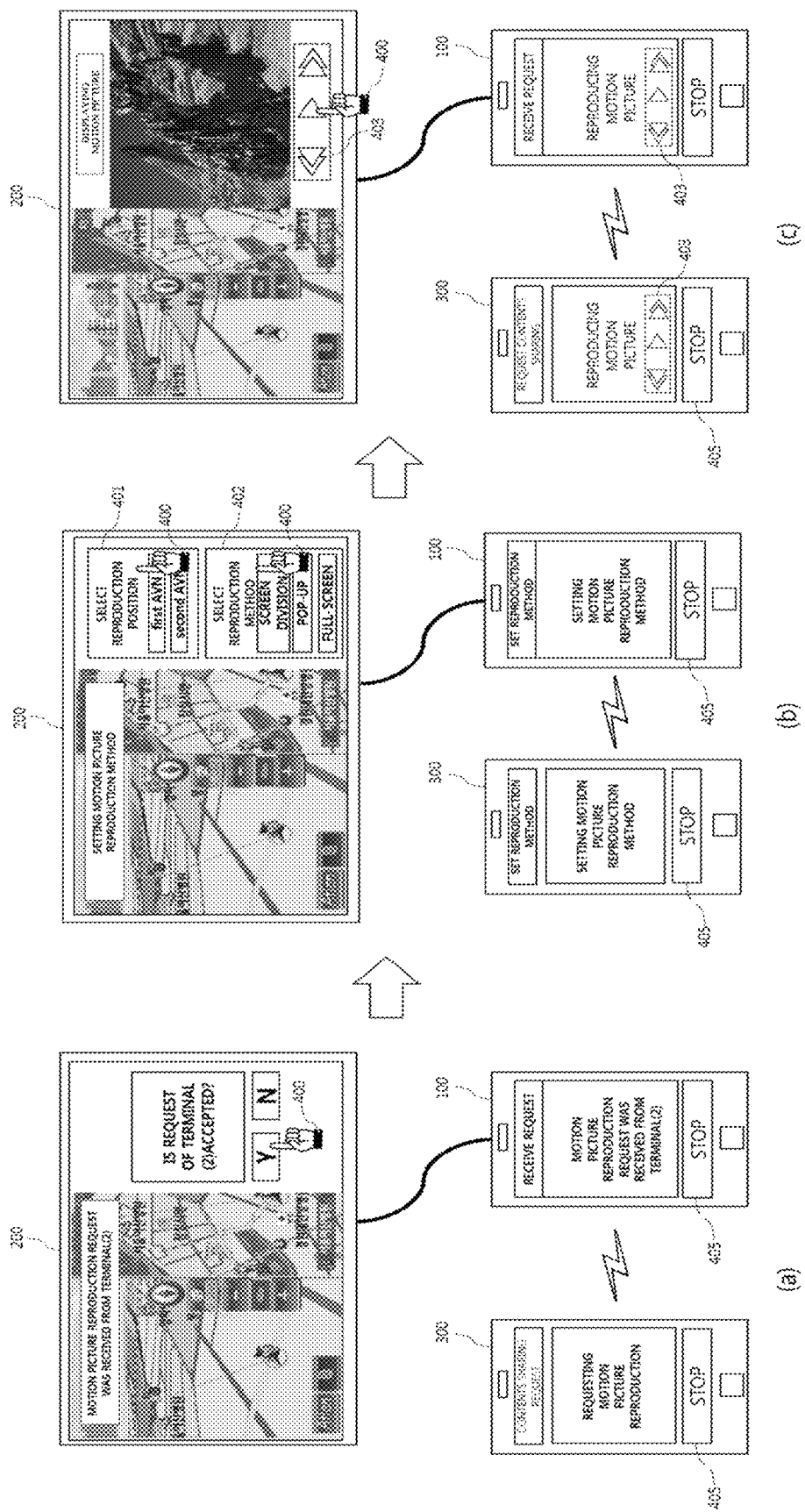
FIG. 6 illustrates a display screen of the first terminal, the second terminal, and the vehicle information providing terminal according to the embodiment of the present invention.

FIG. 6 illustrates operations of the first terminal 100, the second terminal 300, and the vehicle information providing terminal 200 according to the embodiment of the present invention.

As illustrated in FIG. 5, the first terminal 100 may be wiredly/wirelessly connected with the vehicle information providing terminal 200.

The vehicle information providing terminal 200 receives and outputs the contents interface provided from the first terminal 100. Accordingly, the driver may receive the contents interface output from the first terminal 100 through the vehicle information providing terminal 200 while driving.

In this case, when the contents request signal is received from any one second terminal 300 provided in the vehicle, the first terminal 100 transmits to the vehicle information providing terminal 200 that the remote communication request signal is received from the second terminal 300.

Thereafter, when the user accepts the contents request signal, the first terminal 100 relays the contents data between the second terminal 300 and the vehicle information providing terminal 200.

That is, the second terminal 300 transmits the stored contents data to the first terminal 100. In addition, the first terminal 100 receiving the contents data transmits the contents data to the output unit 225 of the vehicle information providing terminal 200.

FIG. 6 illustrates operations of the first terminal 100, the second terminal 300, and the vehicle information providing terminal 200 according to the embodiment of the present invention.

As illustrated in FIG. 6A, the vehicle information providing terminal 200 outputs the contents interface received from the first terminal 100.

As described above, the first terminal 100 outputs a request signal accept selection area of the second terminal 300 to one side of the vehicle information providing terminal 200 as illustrated in FIG. 6, when the contents request signal is received from any one second terminal 300 provided in the vehicle.

In this case, as illustrated in FIG. 6, when the second terminal 300 requests the reproduction of the motion picture to the first terminal 100, a contents sharing request text may be provided on the second terminal 300 and a text notifying that the reproduction of the motion picture is being requested may be provided therebelow.

Further, the second terminal 300 may stop the remote communication between the first terminal 100 and the second terminal 300 in the case where a stop selection area 405 is provided therebelow and the user selects the stop selection area 405.

The first terminal 100 may output a text representing that the motion picture reproduction request is received from the second terminal 300 and the request reception text. Further, in the case where the stop selection area 405 is provided and the user selects the stop selection area 405, the first terminal 100 may stop the remote communication between the first terminal 100 and the second terminal 300.

FIG. 6B illustrates an operation of the vehicle information providing terminal 200 after the user accepts the motion picture reproduction request of the second terminal 300.

The vehicle information providing terminal 200 may output a reproduction position selection area 401 and a reproduction method selection area 402 of the motion picture to be reproduced to one side of the display unit 226.

First, the reproduction position selection area 401 is a selection area which may select to which position the motion picture of the received contents is output in a plurality of vehicle information providing devices positioned in the front of the vehicle. In addition, the reproduction method selection area 402 is an area that selects how the motion picture of the contents are output through the vehicle information providing terminal 200 and may be provided to screen segment reproduction, pop-up reproduction, full-screen reproduction, and the like.

In this case, in the first and second terminals 100 and 300, a text notifying that the motion picture reproduction is being set and the aforementioned stop selection area 405 may be provided.

FIG. 6C illustrates an operation of the vehicle information providing terminal 200 after the user 400 selects the motion picture reproduction position and the motion picture reproduction method.

The vehicle information providing terminal 200 may output the motion picture contents received from the storage unit 325 of the second terminal 300 to one side of the display unit 300.

First, the vehicle information providing terminal 200 may reproduce the motion picture on one side of the display unit 226. Further, a motion picture control means 403 which may control the motion picture which is being reproduced is provided below the motion picture.

In this case, in the first and second terminals 100 and 300, a text notifying that the motion picture is being reproduced and the aforementioned motion picture control means 403 may be provided.

Accordingly, the user 400 may control the motion picture while reproducing by selecting the motion picture control means 403 of any one of the first and second terminals 100 and 300 and the vehicle information providing terminal 200.

Figure 7:
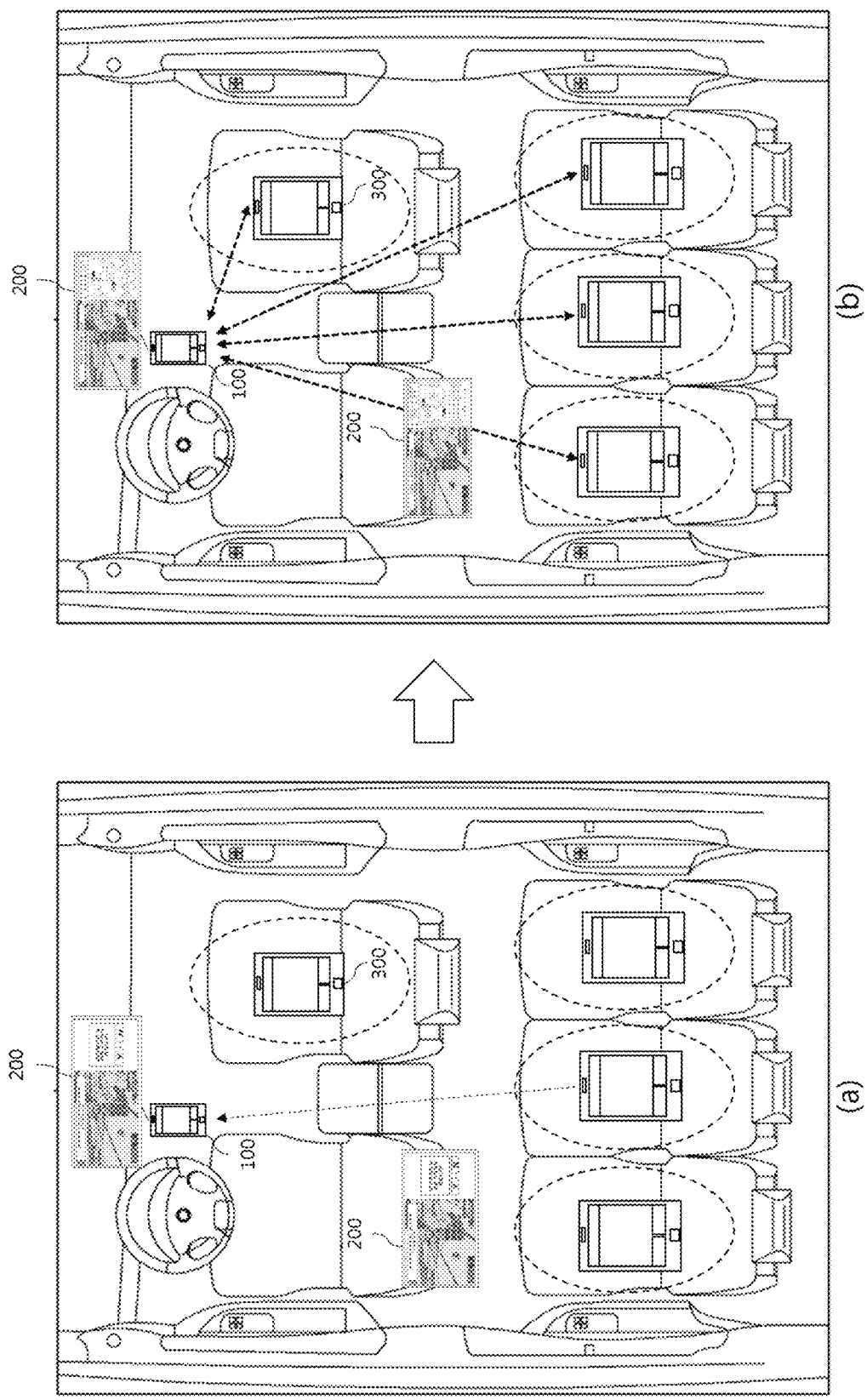
FIG. 7 is an exemplary diagram illustrating a situation in which the first terminal and the second terminal open remote communications according to the embodiment of the present invention.
Figure 8:
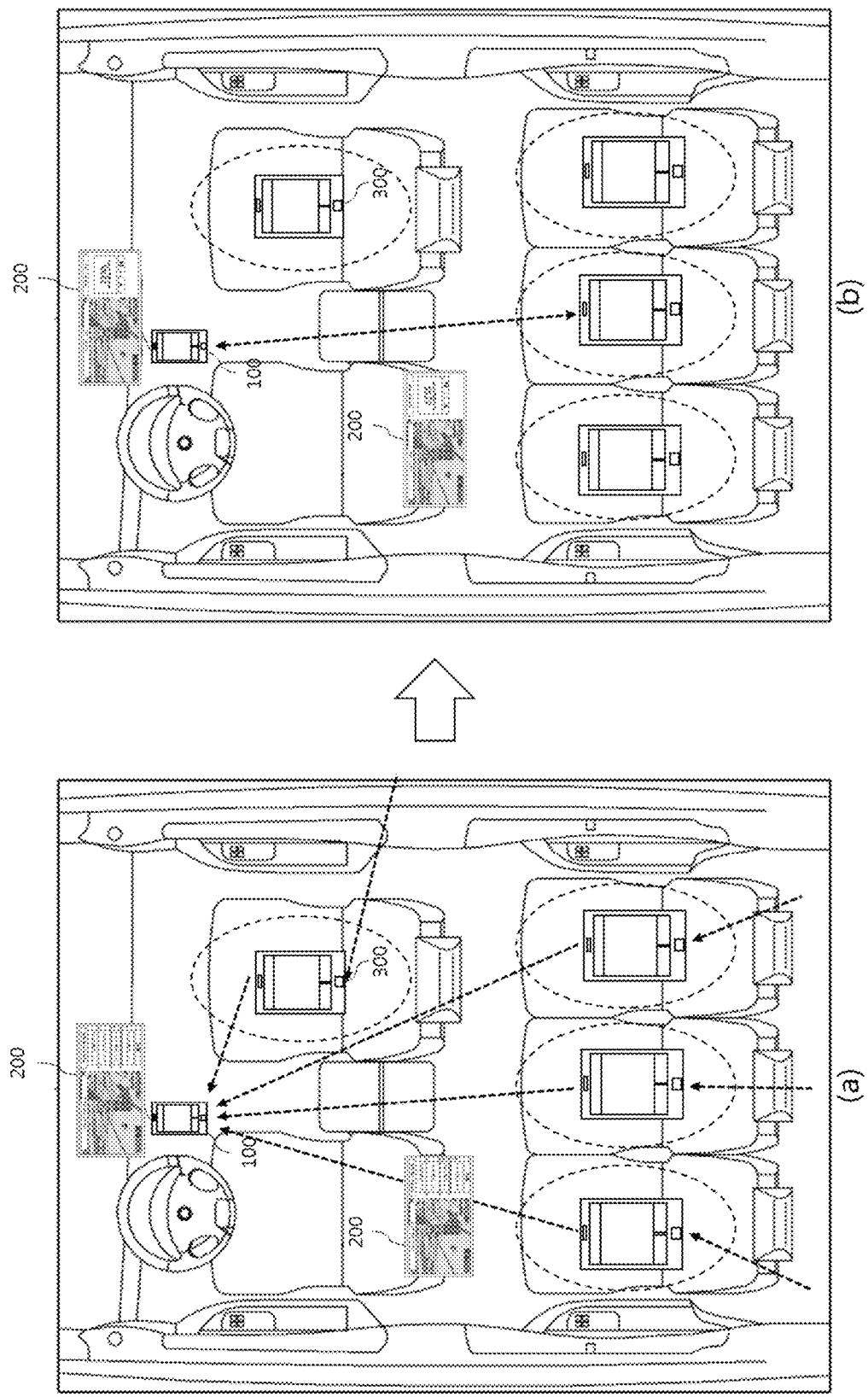
FIG. 8 is an exemplary diagram illustrating a situation in which the first terminal and the second terminal open remote communications according to the embodiment of the present invention.

FIGS. 7 and 8 are exemplary diagrams illustrating a situation in which the first terminal 100 and the second terminal 300 open a channel according to the embodiment of the present invention.

As illustrated in FIG. 7, the first terminal 100 may be wiredly/wirelessly connected with the vehicle information providing terminal 200.

The vehicle information providing terminal 200 receives and outputs the contents interface information provided from the first terminal 100. Accordingly, the driver may receive the contents interface output from the first terminal 100 through the vehicle information providing terminal 200 while driving. Further, a plurality of vehicle information providing terminals 200 may be provided to be disposed at a front side and a rear side of the vehicle.

First, any one second terminal 300 may transmit the contents request signal to the first terminal 100 through remote communication. Thereafter, in the case where the contents requested by the second terminal 300 are not stored in the storage unit 325 of the second terminal 300 or are contents to receive the contents data through wireless communication, the first terminal 100 may receive contents data through at least one second terminal 300 provided in the vehicle.

In this case, when the signal requesting the contents is received from the second terminal 300, the first terminal 100 retrieves a peripheral second terminal 300 in which the contents in the vehicle may be downloaded. As illustrated in FIG. 7B, when the peripheral second terminal 300 in which the contents may be downloaded is retrieved, a selection list of the second terminals 300 provided in the vehicle is output to the vehicle information providing terminal 200. Thereafter, the user may set a contents download ratio for each terminal based on the output selection list of the second terminals 300.

That is, the second terminal 300 may divide and download the contents requested to the first terminal 100 through all terminals provided and retrieved in the vehicle.

FIG. 8A illustrates a situation in which the plurality of second terminals 300 divides and downloads the contents data.

As illustrated in FIG. 8A, the user may divide and download the contents data requested by any one second terminal 300 described above through the plurality of second terminals provided in the vehicle. In addition, the plurality of second terminals may transmit the downloaded contents data to the first terminal 100 through the remote communication.

FIG. 8B illustrates a situation in which the vehicle information providing terminal 200 is controlled by using the second terminal 300.

At least one second terminal 300 transmits the downloaded content data to the first terminal 100 through the remote communication. In addition, the first terminal 100 may transmit the contents data to the display unit 226 of the vehicle information providing terminal 200. As s result, any one second terminal 300 which initially requests the contents may control the vehicle information providing terminal 200 through the remote communication with the first terminal 100.

Figure 9:
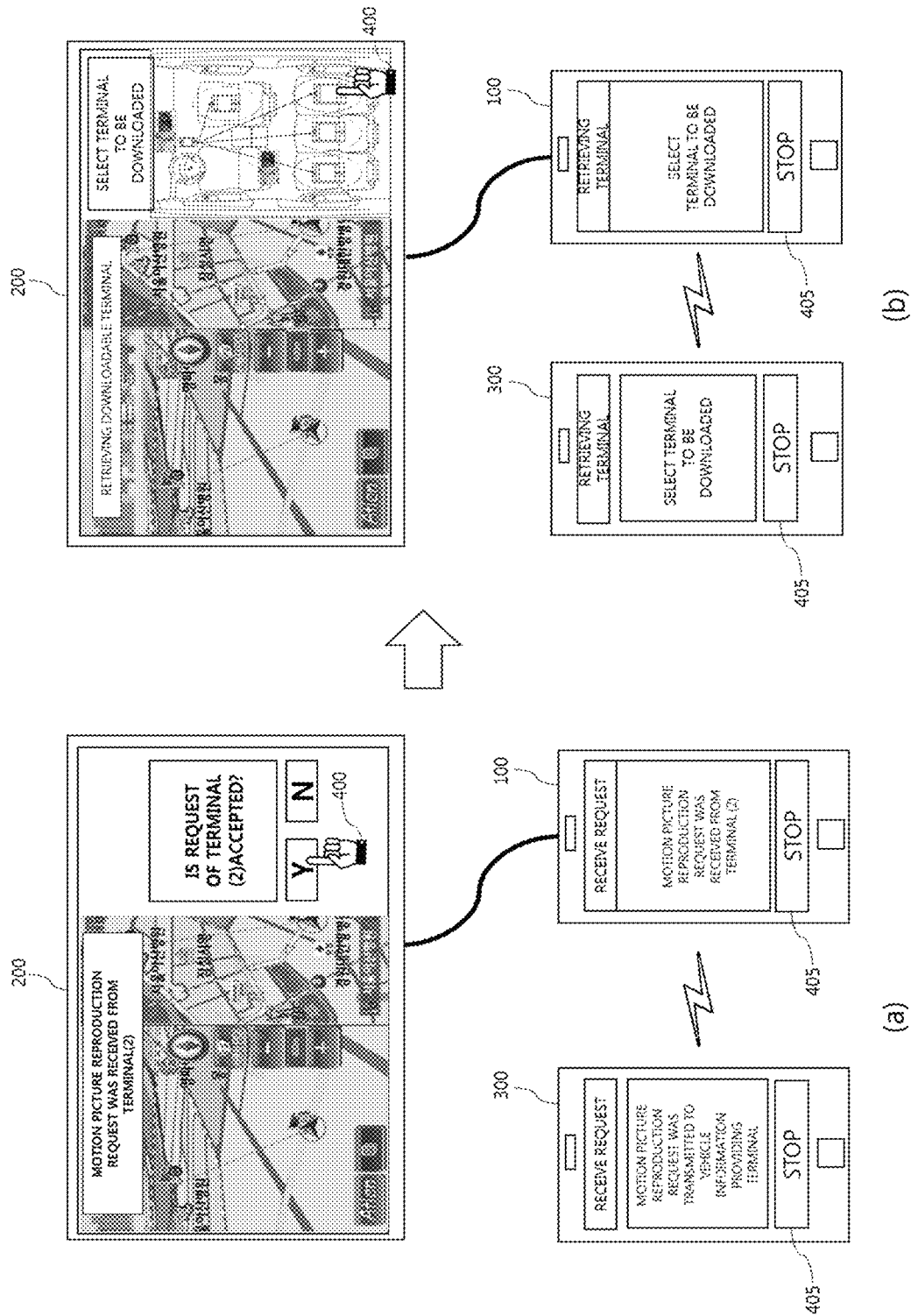
FIG. 9 illustrates a display screen of the first terminal, the second terminal, and the vehicle information providing terminal according to the embodiment of the present invention.
Figure 10:
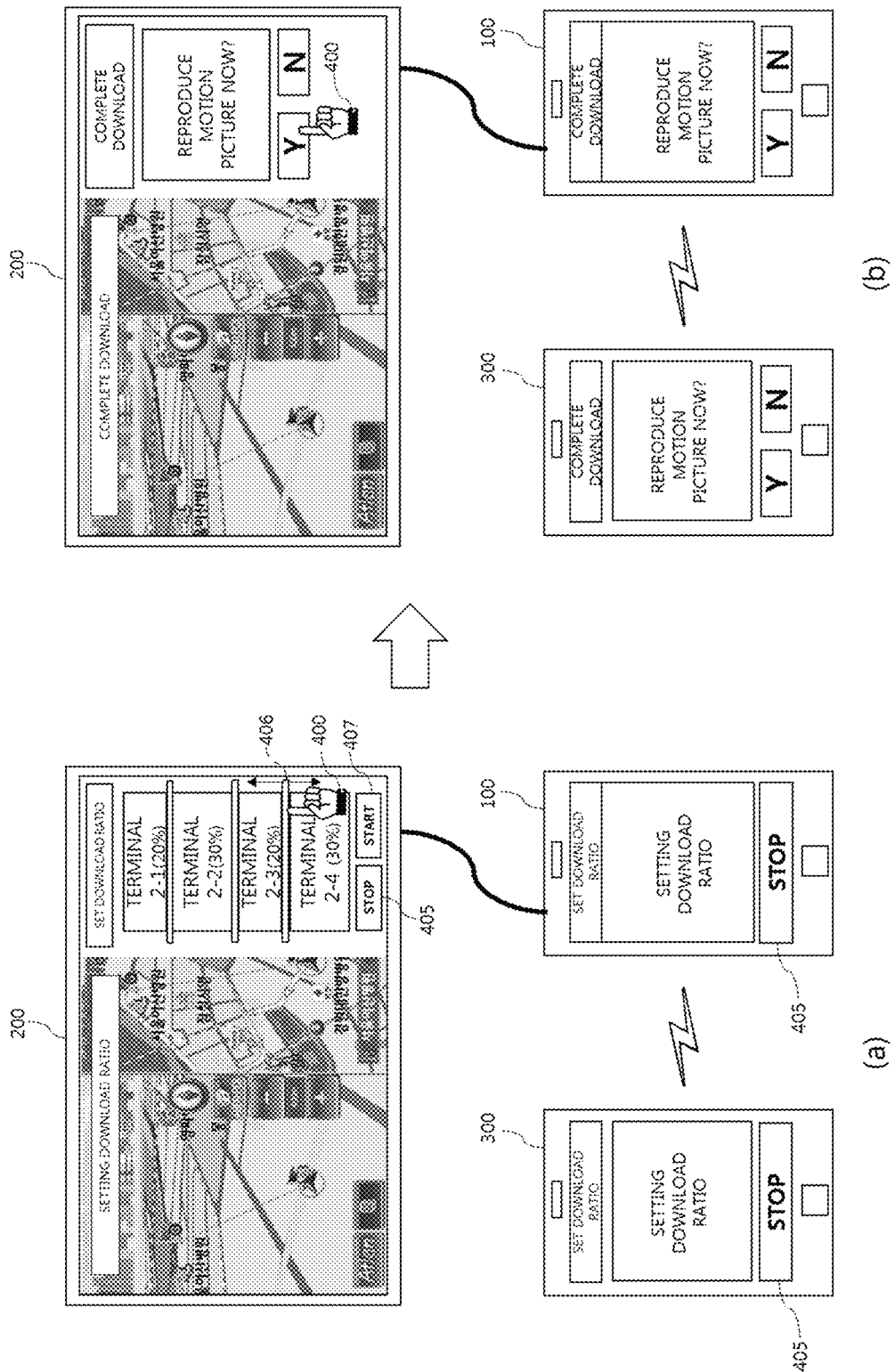
FIG. 10 illustrates a display screen of the first terminal, the second terminal, and the vehicle information providing terminal according to the embodiment of the present invention.

FIGS. 9 and 10 illustrates operations of the first terminal 100, the second terminal 300, and the vehicle information providing terminal 200 according to the embodiment of the present invention.

As illustrated in FIG. 9A, the vehicle information providing terminal 200 outputs the contents interface received from the first terminal 100.

As described above, when the contents request signal is received from any one second terminal 300 provided in the vehicle, the first terminal 100 may output a request signal acceptance area of the second terminal 300 to one side of the vehicle information providing terminal 200 as illustrated in FIG. 9.

Any one second terminal 300 may transmit the contents request signal to the first terminal 100 through the remote communication. Thereafter, in the case where the contents requested by the second terminal 300 are not stored in the storage unit 325 of the second terminal 300 or are contents to receive the contents data through wireless communication, the first terminal 100 may receive the contents data through the second terminal 300 provided in the vehicle.

FIG. 9B illustrates a state in which a terminal to perform the download of the contents data is selected after the plurality of second terminals 300 provided in the vehicle is retrieved.

As illustrated in FIG. 9B, the user 400 may select the plurality of second terminals 300 to perform the download.

In this case, the first terminal 100 may output a text representing that let a terminal be selected, and the second terminal 300 may output a text notifying that the motion picture contents data are being downloaded.

FIG. 10A illustrates a state in which a list of the plurality of second terminals 300 to perform the aforementioned download is output. In this case, as illustrated in FIG. 10A, the user 400 vertically controls a setting bar 406 of the rate output to the vehicle information providing terminal 200 to set a contents download ratio for each second terminal. Thereafter, the user 400 may start a division download by selecting a start selection area 407.

In this case, the first and second terminals 100 and 300 may output a text notifying that the download ratio is being set and stop the download ratio setting by selecting the stop selection area 405. Further, each second terminal 300 transmits the contents data to the first terminal 100 when the download is completed. In addition, the first terminal 100 receives the contents data transmitted by each second terminal 300.

FIG. 10B illustrates a state in which the user 400 may accept the motion picture reproduction when the download of the contents data is completed. As illustrated in FIG. 10B, the user 400 may perform and stop the contents by selecting 'Y' and 'N' selection areas of any one of the first and second terminals 100 and 300 and the vehicle information providing terminal 200.

Figure 11:
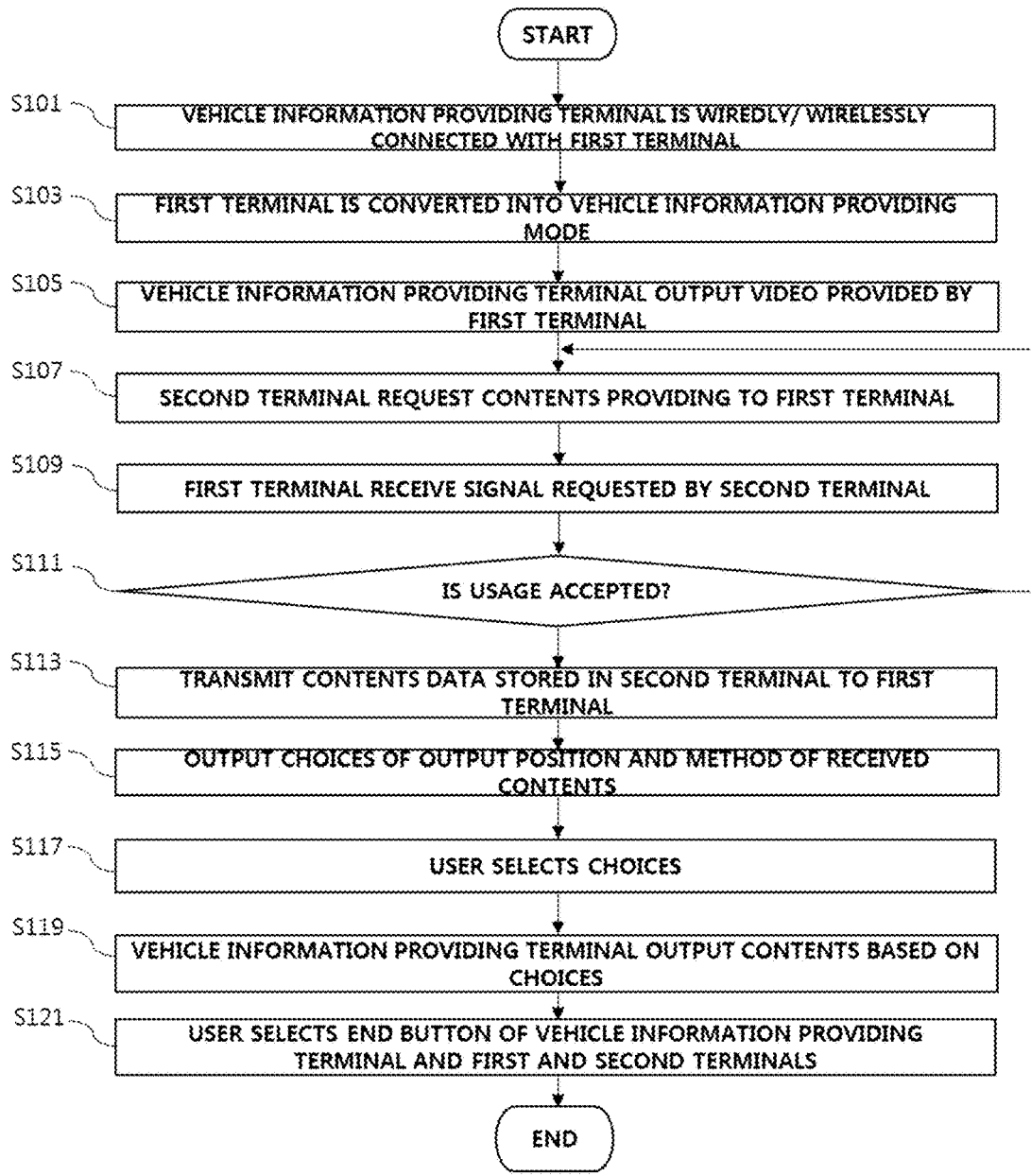
FIG. 11 is a flowchart illustrating an operating method of a terminal according to another embodiment of the present invention.

FIG. 11 is a flowchart illustrating an operating method of the terminal according to the embodiment of the present invention and a flowchart illustrating a case where the contents data requested by the first terminal 100 are stored in the storage unit 325 of the second terminal 300.

First, the first terminal 100 and the vehicle information providing terminal 200 are wiredly/wirelessly connected to the interior of the vehicle (S101).

Thereafter, the first terminal 100 is converted to a vehicle information providing mode (S103). In addition, the vehicle information providing terminal 200 outputs the contents interface provided from the first terminal 100 (S105).

Thereafter, the user transmits the contents request signal to the first terminal 100 by using any one second terminal 300 (S107). In addition, the first terminal 100 receives the contents request signal provided from the second terminal 300 (S109).

Thereafter, the user determines whether the contents request signal output to the first terminal 100 is accepted through the vehicle information providing terminal 200 (S111).

In addition, the second terminal 300 transmits the contents data stored in the storage unit 325 to the first terminal 100 through the remote communication (S113). Further, the first terminal 100 receives the contents data transmitted by each second terminal 300 through the remote communication.

Thereafter, the vehicle information providing terminal 200 outputs a reproduction position selection area 401 and a reproduction method selection area 402 of the received contents (S115), and the user selects the reproduction position selection area 401 and the reproduction method selection area 402 (S117).

In addition, the vehicle information providing terminal 200 outputs the contents data received from the first terminal 100 based on the reproduction position selection area 401 and the reproduction method selection area 402 (S119).

Thereafter, the user selects the stop selection area 405 of the vehicle information providing terminal 200 and the first and second terminals 100 and 300 to complete the providing of the contents provided in the vehicle (S121).

Figure 12:
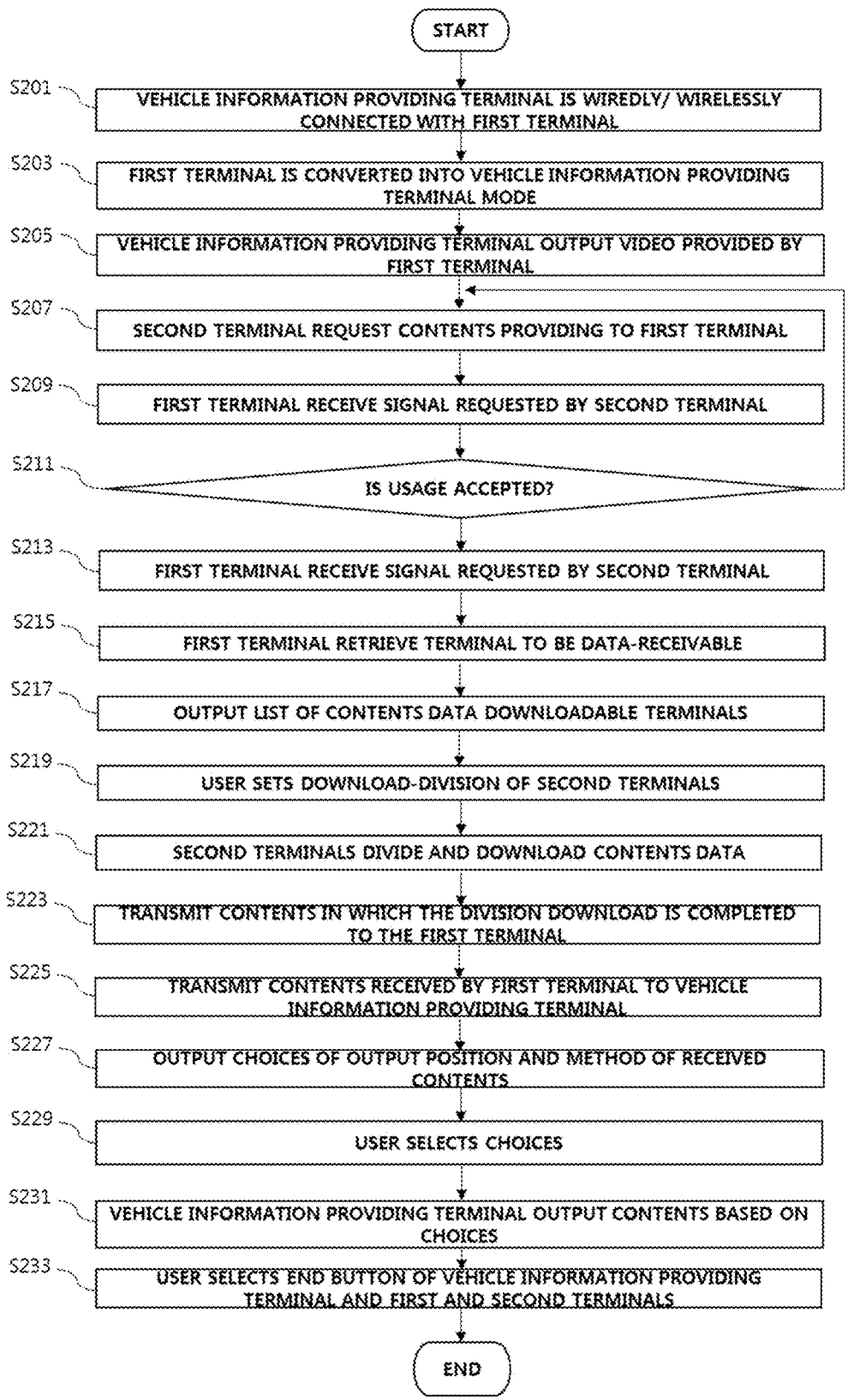
FIG. 12 is a flowchart illustrating an operating method of a terminal according to another embodiment of the present invention.

FIG. 12 is a flowchart illustrating an operating method of the terminal according to the embodiment of the present invention and a flowchart illustrating a case where the contents data requested by the first terminal 100 are not stored in the storage unit 325 of the second terminal 300 or a wireless communication download is required.

First, the first terminal 100 and the vehicle information providing terminal 200 are wiredly/wirelessly connected to the interior of the vehicle (S201).

Thereafter, the first terminal 100 is converted to a vehicle information providing mode (S203).

In addition, the vehicle information providing terminal 200 outputs the contents interface provided from the first terminal 100 (S205).

Thereafter, the user transmits the contents request signal to the first terminal 100 by using any one second terminal 300 (S207). In addition, the first terminal 100 receives the contents request signal provided from the second terminal 300 (S209).

Thereafter, the user determines whether the contents request signal output to the first terminal 100 is accepted through the vehicle information providing terminal 200 (S211). In addition, the first terminal 100 receives the signal requested from the second terminal 300 (S213).

Thereafter, the first terminal 100 retrieves at least one second terminal 300 in which the contents data provided in the vehicle may be downloaded (S215). In addition, the vehicle information providing terminal 200 outputs a list of the second terminals 300 in which the contents data may be downloaded (S217).

The user sets a contents download ratio of each second terminal 300 by controlling a setting bar 406 of the rate which is output to the display unit 226 of the vehicle information providing terminal 200 (S219). Thereafter, the respective second terminals 300 download the set contents data (S221) and transmit the contents data in which the division download is completed to the first terminal 100 (S223).

In addition, the first terminal 100 receives the contents data received from each second terminal 300 and transmits the received contents data to the output unit 225 of the vehicle information providing terminal 200 (S225), and the vehicle information providing terminal 200 outputs output position and method selection areas of the received contents (S227).

Thereafter, the user selects the output position and method selection areas of the contents output to the vehicle information providing terminal 200 (S229). In addition, the vehicle information providing terminal 200 outputs the contents based on the output position and method selection areas (S231).

Thereafter, the user selects a completion selection area of any one of the first and second terminals 100 and 300 and the vehicle information providing terminal 200 to complete the contents providing of the terminal (S233).

Through the process, in the present invention, the first terminal 100 may relay the contents data provided by at least one second terminal 300 provided in the vehicle, when the first terminal 100 of the driver is wiredly/wirelessly connected to the vehicle information providing terminal 200 in the vehicle by the driver while driving the vehicle. As a result, the present invention has advantages of simply sharing the contents data of the second terminal 300 provided in the vehicle by receiving the contents data provided by the second terminal 300 and transferring the received contents data to the vehicle information providing terminal 200 in the first terminal 100, overcoming an inconvenience of separating the first terminal 100 and the vehicle information providing terminal 200, and easily sharing the contents data by the driver and a passenger riding in the vehicle. Further, the present invention has advantages of reducing a time taken for the first terminal 100 to download large contents data by dividing and downloading the large contents data through at least one second terminal 300 provided in the vehicle to transmit the downloaded data to the first terminal 100, when the first terminal 100 downloads the large contents data through wireless communication.

According to the embodiment of the present invention, the aforementioned method may be implemented as a code which is readable by a processor in a medium where the program is recorded. Examples of the medium which readable by the processor include a ROM, a RAM, a CD-ROM, a magnetic tape, a floppy disk, an optical data storage device, and the like, and may also be implemented by a form of a carrier wave (for example, transmission through Internet).

The aforementioned mobile terminal may limitatively adopt the configurations and methods of the embodiments as described, but all or some of the respective embodiments may be selectively combined and configured so that the embodiments are variously modified.

What is claimed is:

1. A vehicle information providing terminal in a vehicle providing vehicle information, the vehicle information providing terminal comprising:
an interface unit connected with a first terminal providing a contents interface;
an output unit receiving and outputting the contents interface provided to the interface unit and providing a selection list through the contents interface when a contents data request signal is received from the first terminal;
a terminal information collection unit retrieving one or more second terminals located in an interior of the vehicle, collecting terminal information of the one or more second terminals and storing the collected terminal information in a storage unit, wherein the one or more second terminals have a configuration to download the contents data, and wherein the output unit outputs the selection list of the one or more second terminals through the contents interface based on the terminal information collected; and
a user input unit receiving a selection input for selecting the one or more second terminals from the selection list, wherein the one or more second terminals are located in the interior of the vehicle and capable of downloading the content data in the selection list,
wherein the interface unit transfers the selection input to the first terminal in order to transmit the contents data request signal of the contents data from the first terminal to the one or more selected second terminals.

2. The vehicle information providing terminal of claim 1, wherein the user input unit receives the selection input for selecting the one or more selected second terminals the selection list by using at least one of the following methods: touch, voice recognition, and motion recognition.

3. The vehicle information providing terminal of claim 1, wherein the user input unit receives a selection input of a reproduction position selection area and a reproduction method selection area when the one or more selected second terminals complete downloading the contents data.

4. The vehicle information providing terminal of claim 1, further comprising:
a vehicle information detection unit detecting at least one of a driving velocity of the vehicle, driving recording information, a driving state of the vehicle, and surrounding situation information of the vehicle to provide the detected information to the output unit.

5. A first terminal of providing a vehicle interface to a vehicle information providing terminal located in a vehicle, the first terminal comprising:
a terminal information collection unit collecting terminal information of the other terminal capable of transceiving contents data,
wherein the terminal information collection unit retrieves one or more second terminals located in an interior of the vehicle, collects the terminal information of the one or more second terminals, and stores the collected terminal information in a storage unit, wherein the one or more second terminals have a configuration to download the contents data;
a wireless communication unit receiving a reproduction request of the contents data transmitted from the other at least one of the one or more second terminals;
a contents interface generator generating a contents interface provided through the vehicle interface based on the terminal information and the contents data reproduction request,
wherein the contents interface generator provides a selection list of the one or more second terminals for a selection, wherein the one or more second terminals are located in the interior of the vehicle and capable of downloading the content data; and
a contents data relay unit reproducing the contents data received from the one or more selected second terminals through the contents interface to control the reproduced contents data to be provided to the vehicle information providing terminal.

6. The first terminal of claim 5, wherein
the contents interface generator further includes:
a driving state determination unit generating driving state information; and
a UI determination unit determining a UI providing method of the contents interface based on the driving state information.

7. The first terminal of claim 6, wherein the UI determination unit determines the UI providing method of the contents interface to at least one of the following methods: touch, voice recognition, and motion recognition and limits a partial function of the contents interface according to the driving state information.

8. The first terminal of claim 5, wherein the terminal information collection unit retrieves the other terminal capable of downloading the contents data and collects network speed information of at least one of the one or more second terminals which is retrieved.

9. The first terminal of claim 5, wherein the contents data relay unit receives the contents data transmitted by the one or more selected second terminal through the wireless communication unit to transfer the received contents data to the vehicle information providing terminal and transfers contents data request signal of the contents data to the one or more selected second terminals selected by a selection input signal received from the vehicle information providing terminal.

10. A terminal positioned in a vehicle, the terminal comprising:
a user input unit;
a wireless communication unit communicating with a first terminal providing a contents interface to a vehicle information providing terminal of the vehicle and receiving data transmitted from a base station; and
a terminal information providing unit providing terminal information to the first terminal in response to a request signal of whether contents received from the first terminal are transmittable,
wherein the wireless communication unit transmits a contents data providing request to the first terminal according to a user input through the user input unit and transmits the contents data to the first terminal in response to an acceptance signal from the first terminal to output the transmitted contents data through the contents interface of the vehicle information providing terminal,
wherein the terminal is selected terminal in one or more second terminals, and
wherein the first terminal comprising:
a terminal information collection unit retrieves the one or more second terminals located in the interior of the vehicle, collects the terminal information of the one or more second terminals, and stores the collected terminal information in a storage unit, wherein the one or more second terminals have a configuration to download the contents data;

a wireless communication unit receives a reproduction request of the contents data transmitted from at least one of the one or more second terminals;

a contents interface generator generates a contents interface provided through the vehicle interface based on the terminal information and the contents data reproduction request, wherein the contents interface generator provides a selection list of the second terminals for selecting one or more second terminals in the selection list, which are located in the interior of the vehicle and capable of downloading the content data; and a contents data relay unit reproduces the contents data received from the one or more selected second terminals through the contents interface to control the reproduced contents data to be provided to the vehicle information providing terminal.

11. The terminal of claim 10, wherein:

the terminal information providing unit transfers the terminal information through a short range communication module included in the wireless communication unit, and the terminal information includes at least one of information on the contents data downloadable from the outside and terminal identification information.

12. The terminal of claim 10, wherein the wireless communication unit receives the contents data from the base station to provide the received contents data to the first terminal, when the first terminal accepts the contents data reproduction.

13. A method of operating a vehicle information providing terminal in a vehicle and a first terminal connected to the vehicle information providing terminal, the method comprising:

retrieving, by the first terminal, one or more second terminals located in an interior of the vehicle, wherein the one or second terminals have a configuration to download contents data;

collecting, by the first terminal, the terminal information of the one or more second terminals;

generating, by the first terminal, a contents interface to provide the generated contents interface to the vehicle information providing terminal based on the terminal information collected, wherein the contents interface provides a selection list of the one or more second terminals for a selection, wherein the one or more second terminals are located in the interior of the vehicle and capable of downloading the content data outputting, by the vehicle information providing terminal, the contents interface;

receiving, by the first terminal, a download reproduction request signal of the contents data;

transmitting, by the first terminal, a list of the one or more selected second terminals positioned in the vehicle to the vehicle information providing terminal;

outputting, by the vehicle information providing terminal, the terminal list of the one or more selected second terminals;

setting a contents download ratio to each of the one or more selected second terminals in the terminal list through the vehicle information providing terminal;

receiving the contents data divided by the contents download ratio, to each of the one or more selected second terminals, wherein the contents divided according to each rate set of the each of the one or more selected second terminals in the terminal list;

transmitting, by each of the one or more selected second terminals, the divided and received contents to the first terminal; and outputting the contents data reproduced in the first terminal through the vehicle information providing terminal.

* * * * *